July 9, 1940.  R. W. NILES  2,206,972
BALL TYPE JOINT
Filed June 25, 1937
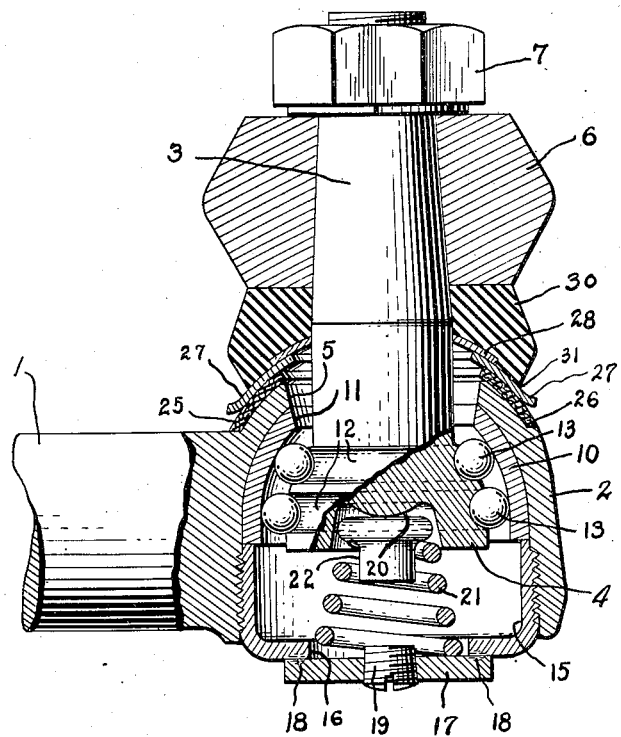
INVENTOR.
Ray W. Niles
BY
Barnes, Kisselle, Laughlin & Raisch
ATTORNEYS Patented July 9, 1940

2,206,972

UNITED STATES PATENT OFFICE 2,206,972

BALL TYPE JOINT

Ray W. Niles, Saline, Mich., assignor to Hoover Ball and Bearing Company, Ann Arbor, Mich., a corporation of Michigan Application June 25, 1937, Serial No. 150,246

3 Claims. (Cl. 287—90)

This invention relates to a joint of the so-called ball type in that there is a universal movement between two connected parts within a limited range.

The invention is concerned with a joint useful in such mechanisms as the steering linkage for automotive vehicles, although, of course, it will be appreciated that the invention may be used wherever such ball type joints are required. The present invention will be described in connection with parts constituting elements in the steering apparatus of an automotive vehicle.

In a joint of this kind some difficulties present themselves in the provision of a seal for protecting the articulating parts. A seal is provided to perform the function of keeping dirt and other extraneous material from coming into contact with the bearing parts, which material may be abrasive, and to retain lubricant or grease in and around the bearing parts. The invention may be used advantageously with a bearing of the antifriction type, and at least with such a bearing, it is probably more important that the seal function to keep out the dirt and extraneous material than it is to retain the grease.

One object of the invention is to provide an improved seal structure which has a plurality of relatively moving parts arranged to move around the center of the ball joint relatively as the ball joint functions in use. These relatively moving parts are preferably placed under some pressure and have faces partially spherical in formation around the center of movement so that in the articulation of the joint the pressure is not varied but remains substantially constant. A further object is to provide a seal structure of a simple effective nature composed of a few parts which can be readily manufactured and easily assembled and which will retain its sealing efficiency over a long period of time. In order to provide for a relatively great angular movement the parts of the sealing structure are arranged in multiple after the fashion of telescoping structure so that in maximum joint articulation the movement is divided between the several parts of the seal structure and is not all taken care of between only two relatively moving parts. A further object of the invention is the provision of a seal structure wherein the seal may be provided by non-metallic elements and preferably by one or more elements of a resilient or elastic nature capable of adjusting itself under pressure to the surface of a cooperating rigid member which may be metallic.

One structure for carrying out the invention is illustrated in the accompanying drawing. In this drawing a portion of a rod member is illustrated at 1; this may be a tie rod or a member arranged to be fastened to the end of a tie rod. The end of this member is fashioned with a head 2 having a partially spherical recess therein. The head 2 constitutes a bearing for an inner member which has a ball type association therewith. This other member is shown as being in the form of a stud 3 having a head 4 positioned inside the partially spherical recess in the member 2, with the stud portion passing out through an opening 5. A rod or other connecting member 6 may be secured to the stud and held thereto by a nut 7, and the presence of the nut 7 and member 6 also holds the members 1 and 3 in assembly.

In the form of joint shown, an antifriction type of bearing is used. To this end an outer race or cup member 10 of suitable bearing metal and of a partially spherical formation is placed inside the head 2, this race member having an opening 11 aligning with the opening 5 for the passage of the stud therethrough. The head 4 is provided with one or more raceways 12, two being shown in the present instance, and antifriction balls 13 lie in the raceways and function between the raceways and surfaces of the bearing member 10.

The head 2 is open at its end opposite the passageway 5 for the reception of the bearing member 10 and it may be closed by a member 15. This member 15 is in the form of a cap or cup arranged to be screw threaded to the head 2; in the form shown the head 2 is provided with internal threads and the cap with external threads. The cap is arranged to be screwed home against the bearing member 10 to hold the same in assembly as illustrated, the cap 15 making contact with the edge of the bearing member 10. The cap 15 may be held in position and restrained from becoming loose in any one of a number of ways; in the form shown a locking type thread is used, which thread need not be described at length herein, but which is so formed that when the cap 15 is screwed tightly into position the threads prevent the cap from becoming loose in use. The cap may be provided with an aperture 16 closed by a nut 17 which may be welded to the cap, as illustrated at 18. The nut 17 has a suitable square or hex shape or is otherwise formed to receive a tool for turning the cap. The nut may be provided with a lubricating aperture arranged to be closed by a plug 19.

In order to hold the bearing members in engagement, the head 4 of the stud is recessed and formed with a crown or arcuate surface 20, and a coil spring 21 reacts against the cap 15 and on a pressure member or contact button 22. The contact between the button and the surface 20 is preferably at the center of the ball action; that is to say, the race 10 is formed partially spherical around the center at the theoretical point contact between the surface 20 and button 22. Thus as the joint functions the stud 3 is capable of oscillating in the race 10 in any direction, within limits, on the balls 13.

The seal structure is for sealing that location where the stud passes out through the head 2. There are several elements arranged to slidably engage each other and formed partially spherical around the center of the ball action. One of such members is illustrated at 25 and this member is preferably non-metallic as for example a molded rubber and fabric composition. The fabric may be what is commonly termed "duck" or "canvas" and the rubber is formed therearound and in the interstices of the fabric and molded in position. This member may be molded in its partially spherical shape and is arranged to be seated upon a similarly shaped exterior portion of the head 2 as shown. For this purpose the exterior of the head may be recessed as illustrated at 26 so that the exterior surface of the member 25 lies substantially flush with the exterior surface of the head 2.

A second member 27, which is preferably metallic, is formed of partially spherical shape and is arranged to seat upon the member 25. A third member is preferably of metal, is illustrated at 28, and it is partially spherical in shape. This member is arranged to seat against the member 27 as illustrated and has a central opening which preferably fairly snugly fits the stud, while the openings in the members 25 and 27 are larger to provide some clearance. The opening for the stud in the member 27 is smaller than the opening in the member 25.

Positioned over these members is a member 30 preferably in the form of a rubber block. This rubber block is of such a nature as to have the requisite flexibility. It is preferably formed with a recess for receiving the member 28 and has an edge portion 31 making direct contact with the member 27. This block has a central aperture for the passage of the stud therethrough and is preferably arranged to engage the stud with a sealing pressure so that grease is prevented from passing out between the stud and the block 30 and dirt is prevented from getting in. When the nut 7 is screwed down tightly against the member 6, the rubber block is placed under compression so that this action serves to hold the several sealing members in tight engagement with each other. Although the member 6 is drawn tightly against the inclined formation of the stud 3, the rubber block and other parts are of such proportions that the requisite compression of the rubber block is attained at the time the nut 7 is screwed home.

The members 27 and 28 may be sheet metal stampings and may be coated or plated with a metal which has a lubricating quality, as for example, cadmium. The coefficient of friction between rubber and cadmium is relatively low as compared with that between rubber and some other metals, with the result that when these metal pieces are cadmium plated there is a nice sliding action of the rubber elements in the function of the device, as will presently appear. However, the invention may be used without so plating these pieces.

As the joint is articulated the stud 3 may rock in the bearing 10 in any direction within the prescribed limits of the structure. In this rocking movement the block 30 and member 28 shift with the stud, and the member 28 may slide along the surface of the member 27, while the portion 31 of the rubber block may also slide along the surfaces of the member 27. This, of course, assumes that the member 27 is held against movement relative to the sealing member 25 at this time. Eventually the stud may contact with the member 27 and then the rubber block 30 and members 28 and 27 will shift with the stud, with the member 27 sliding along the surfaces of the sealing member 25. Thus, in a maximum of movement of the joint, the sliding action is divided, in this, that part of the sliding action of the seal structure takes place between the rubber block and the member 27 and the other part takes place between the member 27 and the sealing member 25. It may be that when the stud is shifted from the position shown to an angular position that the first sliding movement will take place between the member 27 and member 25, and ultimately this will discontinue and then there will be a sliding movement between member 27 and the rubber block 30. Whichever one of these occurs first depends upon the relation of the coefficient of friction between the block 30 and the member 27 on the one hand, and member 27 and sealing member 25 on the other. If the member 27 is plated with cadmium or other metal of a lubricating nature the coefficient of friction is minimized.

It will be observed that metal to metal contact is not relied upon for a sealing action. There is a seal between the member 27 and the non-metallic sealing member 25, and a seal between the member 27 and the portion 31 of the rubber block. The contact between the metal member 28 and metal member 27 is not necessarily relied upon as a seal. The member 28 is provided, in the main, to serve as a support or bridge for supporting that part of the rubber block lying over the same, to prevent the rubber from flowing into the opening in the member 27 when the block is placed under pressure, or for that matter at any other time.

I claim:

1. In a ball and socket type joint including a member with a partially spherical recess having an aperture therethrough, a second member seated in the recess and extending through the aperture; a non-metallic element fixed relative to the first mentioned member and having a relatively large aperture through which the second mentioned member extends, a metallic element in contact with the non-metallic element and having a relatively small aperture through which the second mentioned member extends with clearance, said elements both being of partial spherical formation substantially concentric with the center of the ball joint and being relatively movable, a rubber block around the second mentioned member for movement therewith and having frictional engagement with the said metallic element, and means for placing the rubber block under compression for holding the rubber block, the metallic element and the non-metallic element in frictional engagement.

2. In a ball and socket type joint including a member with a partially spherical recess having an aperture therethrough, a second member seated in the recess and extending through the aperture; a non-metallic element fixed relative to the first mentioned member and having a relatively large aperture through which the second mentioned member extends, a metallic element in contact with the non-metallic element and having a relatively small aperture through which the second mentioned member extends, said elements both being of partial spherical formation substantially concentric with the center of the ball joint, a rubber block around the second mentioned member and having frictional engagement with the said metallic element, and a bridging device surrounding the second mentioned member in close engagement therewith and overlying a part of the metallic element for supporting that portion of the rubber block which overlies the aperture in the metallic element.

3. In a ball and socket type joint including a member with a partially spherical recess having an aperture therethrough, and a second member seated in the recess and extending through the aperture; a ring-like sealing element comprising a rubber constituent disposed on the first mentioned member and surrounding the second mentioned member with a substantial clearance, a metallic ring-like sealing element surrounding the second mentioned member and in contact with the first mentioned element and surrounding the second mentioned member with relatively less clearance, both of said elements being of partial spherical formation substantially concentric with the center of the ball joint, a bridging device of ring form and of partial spherical formation substantially concentric with the center of the ball joint closely surrounding said second member and overlying the clearance between said second mentioned member and said second mentioned element, a block of rubber closely surrounding the second mentioned member and overlying the bridging device and having a portion in frictional engagement with the second mentioned element, and means for holding said rubber block under compression to thereby hold the rubber block and the sealing elements in tight frictional engagement.

RAY W. NILES.